United States Patent
Lemoine et al.

(10) Patent No.: US 6,767,957 B2
(45) Date of Patent: Jul. 27, 2004

(54) SYNTHETIC BITUMEN OIL-WATER EMULSIONS, THEIR PREPARATION AND THEIR APPLICATIONS

(75) Inventors: Guy Lemoine, le Havre (FR); Jean-Philippe Gillet, Gainneville (FR); Yannick Jolivet, le Havre (FR)

(73) Assignee: Total Raffinage Distribution S.A., Puteaux (FR)

( * ) Notice: Subject to any disclaimer, the term of this patent is extended or adjusted under 35 U.S.C. 154(b) by 107 days.

(21) Appl. No.: 09/938,860

(22) Filed: Aug. 27, 2001

(65) Prior Publication Data

US 2002/0052431 A1 May 2, 2002

(30) Foreign Application Priority Data

Aug. 30, 2000 (FR) .............................. 00 11069

(51) Int. Cl.[7] .............................. C08L 57/02
(52) U.S. Cl. .................. 524/801; 524/474; 524/475; 524/476; 524/477; 524/499; 524/526; 524/552
(58) Field of Search ................ 524/474–477, 524/499, 526, 552–553, 801

(56) References Cited

U.S. PATENT DOCUMENTS

| | | | |
|---|---|---|---|
| 4,172,821 A | | 10/1979 | Bloombaum et al. ...... 260/28.5 |
| 4,419,481 A | * | 12/1983 | Schwartz .................... 524/551 |
| 5,234,988 A | * | 8/1993 | Brooks et al. ............... 524/526 |
| 5,414,012 A | | 5/1995 | Hanson et al. .............. 514/416 |
| 5,414,029 A | | 5/1995 | Lemoine et al. |

FOREIGN PATENT DOCUMENTS

| | | | | |
|---|---|---|---|---|
| DE | 149373 A1 | 7/1981 | | |
| DE | 149373 | 7/1981 | ............ | C09D/3/24 |
| DE | 3830679 A1 | 9/1989 | | |
| DE | 3830697 A1 | 3/1990 | ......... | A61K/31/275 |

* cited by examiner

*Primary Examiner*—Peter Szekely
(74) *Attorney, Agent, or Firm*—Sughrue Mion, PLLC

(57) ABSTRACT

An emulsion consists essentially of clear binders and possibly colored pigments, and contains at least one clear synthetic binder with a softening point or ball-ring temperature (TBA), measured according to the NFT 66-008 standard, that ranges between 30 and 100° C., at least one compound from the latex family, introduced in a quantity that ranges between 3 and 40% by weight of the emulsion, water, and at least one emulsifying agent

40 Claims, No Drawings

SYNTHETIC BITUMEN OIL-WATER EMULSIONS, THEIR PREPARATION AND THEIR APPLICATIONS

This invention relates to new synthetic bitumen oil-water emulsions that are essentially made of clear synthetic binders that do not contain any asphaltenes and of polymers, as well as the preparation thereof. The invention also relates to the applications of said emulsions in the manufacture of surface treatments that can be colored, in particular for pigmented dampproofing materials such as colored sealing coats for roofs, as well as for roadway usage.

It is common in prior the art, to use clear synthetic binders, that have, with the exception of the coloring, characteristics that are close to those of natural bitumens (from crude oil, oil shales, heavy oils, bituminous sands, etc . . . obtained in particular by distillation and deasphalting of the heavy fraction resulting from the distillation), in the manufacture of colored coatings. Said clear binders do not contain any asphaltenes and can be obtained in particular, as described in the European patent EP 179 510, through a mixture of a mineral lubricating oil extract and a modified oil resin and/or coumarone-indene resin. They are used to make pigmentable compositions, mixed with colored pigments and possibly other polymers. They are set up using complicated techniques under heat that take a lot of energy.

It is also common knowledge to emulsify natural bitumens, so as to be able to use them in techniques called "cold" techniques for roadway applications.

Furthermore, we can also make clear synthetic binder oil-water emulsions, with aggregates and colored pigments, to make colored coatings designed for roadway or urban surfaces that are placed "cold." However, if, for other applications, we wish to increase the performance of the binder, in particular its cohesiveness and/or its softening point (or "ball-ring" temperature) by adding polymers, the polymer ratio is rapidly limited to a threshold of approximately 7% by weight. This limit stems from the high viscosity of the modified binders obtained, that makes their emulsification very difficult, if not impossible, under common temperature and pressure conditions implemented in the manufacturing procedures.

This is the case in particular in the European patent EP 0 604 258, which belongs to the applicant, and describes an example for obtaining a bitumen-polymer oil-water emulsion, in which the bitumen can be a synthetic bitumen, to which is added a polymer, that is grafted or reticulated in situ under heat in the bitumen. The ratio of polymer in the emulsion does not exceed 5% by weight and the preparation procedure requires a relatively complex implementation.

The applicant has established that, surprisingly, through the emulsification of a clear synthetic binder in combination with at least one compound of the latex family, we can obtain an enhanced synthetic bitumen emulsion particularly advantageous thanks to its especially high polymer content, while maintaining a viscosity that is satisfactory, which makes its implementation easier in particular for the applications using techniques called "cold". This emulsion is particularly advantageous in making surface treatments or layers, in particular colored, and it provides these coatings with increased characteristics, thanks to the high ratio of polymer that can be incorporated, in particular concerning their softening point, their cohesion, their resistance to aging, as well as an enhanced rheological behavior.

Thus the invention's first object is a synthetic bitumen emulsion that can be used namely in the making of colored coatings, made essentially of clear binders and possibly of colored pigments, characterized by the fact that it contains:

- at least one clear synthetic binder whose softening point or Ball-Ring Temperature (TBT), measured according to the NFT 66-008 standard, that ranges between 30 and 100° C.,
- at least one compound of the latex family, introduced in a quantity that ranges between 3 and 40% by weight of the emulsion,
- water
- and at least one emulsifying agent More particularly, the compound of the latex family is chosen from among the acrylic polymers or the natural or synthetic rubbers that can be used in the form of an aqueous dispersion such as:

- EPDM (ethylene-propylene-diene-monomer),
- EPM (ethylene-propylene monomer),
- S.B.R. (styrene-butadiene rubber) statistic or S.B.S. (styrene-butadiene-styrene) sequenced, linear or star-shaped, or S.I.S. (styrene-isoprene-styrene) styrene-butadiene copolymers,
- polyisobutylene,
- polybutadiene,
- polyisoprene,
- polychloroprene.

Preferably, the compound of the latex family is introduced in a quantity that ranges between 5 and 30% by weight of the emulsion.

In a first method of execution, the clear synthetic binder contains at least one plasticizing agent with an aromatic extract base from a petroleum fraction and at least one structuring agent with an oil resin base.

However, the clear synthetic binder can also contain at least one plasticizing agent with an aliphatic hydrocarbonic compound base whose number of carbon atoms is greater than or equal to 20, and at least one structuring agent with a cycloaliphatic hydrocarbonic polymer.

The plasticizing agent used in the context of this invention, is preferably chosen from among:

a) natural or synthetic aliphatic oils
b) polymers with a low degree of polymerization, such as polyolefins.

In particular, the aliphatic oils have an aniline point that is greater than or equal to 90° C. (according to the ASTM D 611 method) and, preferably greater than or equal to 110° C.

Preferably, these aliphatic oils are chosen from among the hydrogenated white oils, that contain at least 60% of paraffin base carbon atoms (according to the ASTM D 2140 method).

The polymers that constitute the plasticizing agent have a viscosity index (VI) (according to the ASTM D 2270 method) that is greater than or equal to 100 and preferably greater than or equal to 120.

Preferably, these polymers are of the polybutene type, whose molecular mass number ranges between 900 and 2600 and whose cinematic viscosity at 100° C. (according to the ASTM D 445 method) ranges between 200 and 4600 cSt (200 to 4600 mm$^2$/s).

The structuring agent as set forth in the invention is a polycycloaliphatic thermoplastic resin, in particular of the polycyclopentane type, with a low molecular mass.

More particularly, the polycyclopentane type thermoplastic resin has a softening point (or Ball-Ring temperature, TBA, measured according to the NFT 66-008 standard) that is greater than 125° C. and a Gardner color index (according to the NFT 20-030 standard) of at the most 1.

The ratio by weight between the structuring agent and the plasticizing agent, as set forth in the invention, advantageously ranges between 0.4 and 1.5.

As set forth in the invention, the plasticizing agent is used in a quantity that ranges between 40 and 70% by weight of the clear synthetic binder.

The clear synthetic binder, as defined above, has a penetrability that ranges between 20 and 300 tenths of a mm (according to the NF T66-044 standard).

In addition, the clear synthetic binder of the emulsion as set forth in the invention can contain either vinyl ethylene-acetate (EVA) or S.B.S. sequenced styrene-butadiene type copolymers, or low density polyethylene type polymers. The incorporation of these polymers proves useful in hardening the binder, reducing the penetrability values and strengthening the cohesion.

Thus, in order to perform the emulsion as set forth in the invention, the applicant successfully used a non ionic or cationic, polychloroprene latex emulsion, with a concentration of dry matter of 55 to 59% and a specific mass that ranges between 1.09 and 1.14 g/cm$^3$.

The emulsion as set forth in the invention can contain, preferably:

between 40 and 70% by mass of synthetic binder between 5 and 30% by mass of latex between 60 and 30% by mass of water between 3 and 10% by mass of emulsifying agent The preparation of the emulsion as set forth in the invention requires the use of an emulsifier, that is preferably cationic or non ionic. A range of preferred emulsifiers consists, for example, of emulsifiers with a C10 to C15 ethoxylized secondary alcohol base, introduced at a ratio that ranges between 3 and 8% by mass of the emulsifying solution. Other emulsifiers, such as polyvinyl alcohols, can also be used advantageously.

The incorporation of the emulsifying can be performed in part previously in the synthetic binder, before introducing the emulsifying solution for the emulsification of the bitumen which will take place in a mixer with a very high shear rate.

Another object of the invention is a procedure for preparing this emulsion, characterized by the fact that it consists of the following steps:

a) preparation of a synthetic binder, by mixing in a form that is mostly homogenous, in a melted state, at least one plasticizing agent and at least one structuring agent, b) emulsification of the synthetic binder obtained in a) using an oil-water solution of an emulsifying agent, while maintaining the mixture obtained at a temperature that is sufficient to obtain a stable emulsion, c) cooling of the emulsion and incorporation of the latex in the form of an emulsion, under agitation at room temperature.

The first step a) of the preparation procedure of the synthetic binder emulsion as set forth in the invention consists in mixing the components of the synthetic binder at a temperature that can range between 180 and 200° C., in a dynamic mixing chamber with a rotor, for a period that can last from 1 to 1.5 hours, in order to obtain a homogenous mixture.

The second step b) of the process as set forth in the invention consists of the incorporation, under agitation, of an emulsifying solution made with a non ionic or cationic emulsifier to the synthetic binder, introduced at a ratio that ranges between 3 and 8% by mass of the emulsifying solution. This emulsification is performed using a mixer with a strong agitation. The emulsion thus obtained has a ratio of dry matter that ranges between 30 and 75%.

After cooling the emulsion, the incorporation of the latex emulsion takes place, preferably in non ionic or cationic form, at a ratio that advantageously ranges between approximately 15 and 30% by mass, by mechanical mixing at room temperature. We note a good stability of the bitumen/polymer emulsion obtained whose ratio of dry matter ranges between 56 and 60%.

One can also plan on incorporating the polymer in latex form, during the emulsification of the synthetic binder, by adding it to the emulsifying system during step b).

In another variant of the process as set forth in the invention, the synthetic binder is obtained by mixing a plasticizing agent that is comprised of an aliphatic hydrocarbonic compound whose number of carbon atoms is greater than or equal to 20 and a structuring agent that consists of a cycloaliphatic hydrocarbonic polymer.

The final emulsion can also contain colored pigments, introduced in the form of emulsions. We note no break down of the final emulsion due to this introduction and, to obtain a certain opacity, it may be necessary to add other pigments, such as for example, titanium dioxide. The dispersion of the coloring agents is done through mechanical agitation.

The break down of the emulsion as set forth in the invention can be done, when a non ionic emulsifier is used, by evaporation of the water at room temperature or by heating, in particular by hot air or microwaves.

In the case where a cationic emulsifier is used, the break down of the emulsion is done through a chemical process (assisted by the presence of aggregates.)

The synthetic bitumen layer obtained through evaporation of the water from this emulsion has a ball-ring temperature (TBA) that is greater than 100° C. and can exceed 160° C. whereas before the emulsion, the clear synthetic binder has a TBA that is less than 50° C.

Considering the high viscosity of this composition, its adhesive properties and its good light stability, this emulsion is particularly well adapted to being used as a coating that can replace certain polymeric coatings such as vinyl polychloride plastisols, polymer emulsions or paints.

Another object of the invention consists in the application of such an emulsion for the making of a colored surface treatment on a dampproofing material such an a membrane or coating, consisting of at least one base layer, where this application is characterized by the fact that the synthetic bitumen deposit, to which are added colored pigments, is obtained by the spread coating of said emulsion on the base layer and evaporation of its water.

The surface treatment layer has a ball-ring temperature (TBA) that is greater than 160° C. and a thickness that is less than 1 mm and preferably less than 500 μm.

We note that such a surface layer has a light stability that is comparable to that of certain polymeric coatings such as vinyl polychloride plastisols (PVC).

Preferably, the sealing material to be treated consists of a bitumen-polymer mix based support layer.

Another object of the invention consists in the application of an emulsion as set forth in the invention for the making of a colored surface treatment for cold roadway applications, such as superficial seal coats, cold cast coatings, and slurries, on a base layer, where this application is characterized by the fact that the deposit of the synthetic binder, to which are added colored pigments and aggregates, is obtained by the cold spreading and break down of said emulsion.

The surface coating layer thus obtained may have a thickness that is less that 1.5 cm and preferably less than or equal to 0.8 cm. It has enhanced cohesion properties and adhesion to the base layer properties.

Cationic emulsions that are adapted to the nature of the aggregates are advantageously used in spreading and coating. These emulsions have a binder content that ranges between approximately 60 and 70% by weight.

In general, we note that the characteristics of the basic synthetic binder to which is added a latex, as set forth in the invention, are greatly improved, in particular concerning its cohesiveness, its passive adhesiveness, its behavior at low temperatures (brittle point less than −20° C.), its TBA, its plasticity range, it resistance to aging and its rheologic behavior.

The following example, which is not limitative, shows a preferred method of execution of the invention.

EXAMPLE

This example relates to the preparation of a synthetic bitumen emulsion as set forth in the invention:

1) Preparation of the Clear Synthetic Binder:
   The synthetic binder used contains:
   59.5% by weight, as a platicizing agent, of a polybutene with a molecular mass number of 2600 and with a cinematic viscosity at 100° C. (according to the ASTM D 445 method) of 4300 cSt (or mm$^2$/s) sold under the commercial name "Dynapak H-2000" by the Pakhoed company and
   40.5% by weight, as a structuring agent, of a saturated cycloaliphatic hydrocarbonic resin, with a melting point or ball-ring temperature (TBA) of 140° C., a molecular mass number of 400, and a Gardner color index (according to the NF T 20-030 standard) of 1, sold under the commercial name "Escorez 5340" by the Exxon company.

In this case, the ratio by weight between the structuring agent (resin) and the plasticizing agent is 0.68.

The preparation of the mixture is done in a Rayneri mixer, at 180° C., for approximately 1.5 hours, until a homogenous mixture is obtained.

The synthetic binder obtained has the following characteristics:
   penetrability at 25° C. at 1/10 mm (according to the NF T 66-004 standard): 165
   ball-ring temperature in ° C. (according to the NF T 66-008 standard): 41

2) Preparation of the Synthetic Binder Emulsion
   The emulsifier is incorporated into the synthetic binder at a ratio of approximately 8% by mass, using as emulsifier a non-ionic type ethoxylized C13 to C15 secondary alcohol, sold under the commercial name "Tergitol 15S 9" by the Union Carbide company, under agitation with a Rayneri mixer, for 30 min at a temperature of 160° C.

Furthermore, we prepare an emulsifying solution at 8% of "Tergitol 15S9" in water, at a temperature of 60° C. and this emulsifying solution is then introduced into the bitumen for the emulsification, which is carried out in an ultramixer of the "Ultra Turrax" type with a shearing time of 5 min (low and high speed);

The emulsion is then cooled using a Rayneri mixer.

The composition of the emulsion is as follows, in % by weight:
   synthetic bitumen: 52
   "Tergitol" emulsifying agent: 8
   water: 40
and its dry matter ratio is of approximately 60%.

3) Preparation of the Synthetic-Latex Binder Emulsion
   30% by mass of a polychloroprene latex in a cationic oil-water emulsion with a dry matter content of 56%, a density of 1.12 g/cm$^3$ and a pH equal to 2.1 is incorporated into the previous emulsion. The homogenization is carried out by mechanical agitation at room temperature.

The emulsion obtained is stable, has a dry matter ratio at 140° C. of 56.3% and an average particle diameter of 14.3 μm.

4) Coloring Tests
   3 parts of a yellow azo pigment in emulsion and 5 parts of a titanium dioxide white pigment are added to 100 parts of the previous emulsion
   A second test is carried out with a green pigment (copper phtalocyanine) introduced using the same proportions as with the yellow pigment.
   The dispersion of the coloring agents is done through a manual mechanical agitation.

5) Tests on the Sealing Coats
   The emulsion break down is done by evaporation outdoors. The thickness of the colored binder is of approximately 200 μm.
   The TBA value is greater than 160° C. and therefore the layer obtained has greatly improved mechanical characteristics.

6) Light Resistance
   The coatings obtained are subjected to an aging test in a drying oven with a lamp that provides artificial light that reproduces daylight (lamp power: 528 W/m$^2$), at 35° C. for 250 to 450 hours. This test simulates the behavior of the materials after implementation and application.
   The evaluation of the color of the samples using a Minolta CR-300 chromometer has given the results that appear the table 1 below (in which "Synt. Binder" means "synthetic binder").

TABLE 1

| Aging test | Sample | ΔE (Color deviation) | ΔL (clarity deviation) | Δa green–red | Δb blue–yellow |
|---|---|---|---|---|---|
| Daylight 250 h | Synt. Binder/ yellow latex | +15.04 | −2.52 | +1.92 | −14.7 |
| Daylight 450 h | Synt. Binder/ yellow latex | +25.18 | −4.63 | +3.3 | −24.53 |
| Daylight 250 h | Synt. Binder/ green latex | +19.96 | −9.98 | +16.86 | +3.79 |
| Daylight 450 h | Synt. Binder/ green latex | +22.76 | −11.84 | +19.1 | +3.61 |

Therefore, the light stability of the synthetic binder/polychloroprene mixtures as set forth in the invention is good. Under the effect of natural light, the intensity of the variation in color of the synthetic binder/polymer mixture is comparable for the yellow and the green colorings.

Furthermore, these emulsions make it possible to prepare colored coatings that are not very thick and in particular have a high softening point.

What is claimed is:
1. Synthetic bitumen emulsion, that can be used in making colored coatings, consisting essentially of clear binders and optionally colored pigments, characterized by the fact that it contains:
   between 40 and 70% by mass of at least one clear synthetic binder with a softening point or a ball-ring temperature (TBA) measured in accordance with the NF T 66-008 standard, that ranges between 30 and 100° C., between 5 and 30% by mass of at least one compound of the latex family, between 60 and 30% by mass of water, and between 3 and 10% by mass of at least one emulsifying agent.

2. Emulsion as set forth in claim 1, characterized by the fact that the compound of the latex family is selected from the group consisting of acrylic polymers, natural rubber, and synthetic rubbers that can be used in the form of an aqueous dispersion, wherein the synthetic rubbers are selected from the group consisting of:

EPDM (ethylene-propylene-diene-monomer),

EPM (ethylene-propylene monomer), the S.B.R. (styrene-butadiene rubber) statistic or S.B.S. (styrene-butadiene-styrene) sequenced, linear or star-shaped, or S.I.S. (styrene-isoprene-styrene) styrene-butadiene copolymers, polyisobutylene, polybutadiene, polyisoprene, and polychloroprene.

3. Emulsion as set forth in claim 1, characterized by the fact that said clear synthetic binder contains at least one plasticizing agent with an oil fraction aromatic extract base and at least one structuring agent with an oil resin base.

4. Emulsion as set forth in claim 1, characterized by the fact that said clear synthetic binder contains at least one plasticizing agent with an aliphatic hydrocarbonic compound base, whose number of carbon atoms is greater than or equal to 20, and at least one structuring agent with a cycloaliphatic hydrocarbonic polymer base.

5. Emulsion as set forth in claim 4, characterized by the fact that the plasticizing agent is selected from the group consisting of:

natural aliphatic oils, synthetic aliphatic oils, polymers having a viscosity index (VI) (according to the ASTM D2270 method) that is greater than or equal to 100, and polyolefins.

6. Emulsion as set forth in claim 5, characterized by the fact that the aliphatic oils have an aniline point that is greater than or equal to 90° C. (according to the ASTM D611 method).

7. Emulsion as set forth in claim 5, characterized by the fact that the aliphatic oils are hydrogenated white oils that contain at least 60% of paraffinic carbon atoms (according to the ASTM D2140 method).

8. Emulsion as set forth in claim 5, characterized by the fact that the polymers are polybutene, with a molecular mass number that ranges between 900 and 2,600 and a kinematic viscosity at 100° C. (according to the ASTM D445 method) that ranges between 200 and 4,600 cSt (or $mm^2/s$).

9. Emulsion as set forth in claim 4, characterized by the fact that the structuring agent is polycyclopentane.

10. Emulsion as set forth in claim 9, characterized by the fact that the polycyclopentane has a softening point (ball-ring temperature) that is greater than 125° C., and a Gardner color index (according to the NET 20-030 standard) of at the most 1.

11. Emulsion as set forth in claim 3, characterized by the fact that the ratio by weight between the structuring agent and the plasticizing agent ranges between 0.4 and 1.5.

12. Emulsion as set forth in claim 3, characterized by the fact that the plasticizing agent is introduced in a quantity that ranges between 40 and 70% by weight of the clear synthetic binder.

13. Emulsion as set forth in claim 1, characterized by the fact that clear synthetic binder has a penetrability that ranges between 20 and 300 tenths of a millimeter.

14. Emulsion as set forth in claim 1, characterized by the fact that the clear synthetic binder contains either vinyl ethylene-acetate (EVA) or S.B.S. sequenced styrene-butadiene copolymers, or low density polyethylene polymers.

15. Procedure for preparing an emulsion as set forth in claim 1, characterized by the fact that it consists of the following steps:

a) preparation of a synthetic binder, using a mixture that is substantially homogenous in its melted state of at least one plasticizing agent and at least one structuring agent, b) emulsification of the synthetic binder obtained in a) using an aqueous solution of an emulsifying agent, while maintaining the mixture obtained at a temperature that is sufficient for obtaining a stable emulsion, and c) cooling of the emulsion and incorporation of the latex in the form of an emulsion, under agitation at room temperature.

16. Procedure as set forth in claim 15 characterized by the fact that step a) consists in mixing the components of the synthetic binder at a temperature that ranges between 180 and 200° C.

17. Procedure as set forth in claim 15, characterized by the fact that the second step b), consists of the incorporation into the synthetic binder, under agitation, of an emulsifying solution made from a non-ionic or cationic emulsifier, introduced at a ratio that ranges between 3 and 8% by mass of the emulsifying solution.

18. Procedure as set forth in claim 15, characterized by the fact that in step c) the latex emulsion is either non-ionic or cationic, and the incorporation of the latex emulsion is carried out at a ratio that ranges between approximately 15 and 30% by mass, at room temperature.

19. Procedure as set forth in claim 15, characterized by the fact that the synthetic binder is obtained by mixing a plasticizing agent that consists of an aliphatic hydrocarbonic compound, whose number of carbon atoms is greater than or equal to 20 and a structuring agent that consists of a cycloaliphatic hydrocarbonic polymer.

20. Application of an emulsion as set forth in claim 1, to the making of a colored surface treatment on a damp-proofing material that consists of at least one base coat, characterized by the fact that the synthetic bitumen deposit, to which are added colored pigments, is obtained by spreading this emulsion on the base coat and breaking down the emulsion by evaporation of its water.

21. Application as set forth in claim 20, characterized by the fact that the surface treatment layer has a ball-ring temperature (TBA) that is greater than 160° C.

22. Application of an emulsion as set forth in claim 1, to the making of a colored surface treatment for cold roadway applications on a support, characterized by the fact that the deposit of the synthetic binder, to which are added colored pigments and aggregates, is obtained by cold spreading and chemical break down of said emulsion.

23. Emulsion as set forth in claim 6, characterized by the fact that the aliphatic oils have an aniline point that is greater than or equal to 110° C. (according to the ASTM D611 method).

24. Emulsion as set forth in claim 5, characterized by the fact that the polymers that make up the plasticizing agent have a viscosity index (VI) (according to the ASTM D2270 method) that is greater than or equal to 120.

25. Application of an emulsion as set forth in claim 20, wherein the damp-proofing material is a membrane or coat.

26. Application of an emulsion as set forth in claim 22, wherein the cold roadway applications are selected from the group consisting of sealing coats, cold poured coats, and slurries.

27. Synthetic bitumen emulsion, that can be used in making colored coatings, consisting essentially of clear binders and optionally colored pigments, characterized by the fact that it contains:

at least one clear synthetic binder with a softening point or a ball-ring temperature (TBA), measured in accordance with the NF T 66-008 standard, that ranges between 30 and 100° C., at least one compound of the latex family, introduced in a quantity that ranges between 3 and 40% by weight of the emulsion, water, and at least one emulsifying agent, characterized by the fact that said clear synthetic binder contains at least one plasticizing agent with an oil fraction aromatic extract base and at least one structuring agent with an oil resin base.

28. Emulsion as set forth in claim 27, characterized by the fact that the ratio by weight between the structuring agent and the plasticizing agent ranges between 0.4 and 1.5.

29. Emulsion as set forth in claim 27, characterized by the fact that the plasticizing agent is introduced in a quantity that ranges between 40 and 70% by weight of the clear synthetic binder.

30. Synthetic bitumen emulsion, that can be used in making colored coatings, consisting essentially of clear binders and optionally colored pigments, characterized by the fact that it contains:

at least one clear synthetic binder with a softening point or a ball-ring temperature (TBA), measured in accordance with the NE T 66-008 standard, that ranges between 30 and 100° C., at least one compound of the latex family, introduced in a quantity that ranges between 3 and 40% by weight of the emulsion, water, and at least one emulsifying agent, characterized by the fact that clear synthetic binder has a penetrability that ranges between 20 and 300 tenths of a millimeter.

31. Procedure for preparing a synthetic bitumen emulsion that can be used in making colored coatings, the synthetic bitumen emulsion consisting essentially of clear binders and optionally colored pigments, characterized by the fact that the synthetic bitumen emulsion contains:

at least one clear synthetic binder with a softening point or a ball-ring temperature (TBA), measured in accordance with the NF T 66-008 standard, that ranges between 30 and 100° C., at least one compound of the latex family, introduced in a quantity that ranges between 3 and 40% by weight of the emulsion, water, and at least one emulsifying agent, characterized by the fact that the procedure consists of the following steps:

a) preparation of a synthetic binder, using a mixture that is substantially homogenous in its melted state of at least one plasticizing agent and at least one structuring agent, b) emulsification of the synthetic binder obtained in a) using an aqueous solution of an emulsifying agent, while maintaining the mixture obtained at a temperature that is sufficient for obtaining a stable emulsion, and c) cooling of the emulsion and incorporation of the latex in the form of an emulsion, under agitation at room temperature.

32. Procedure as set forth in claim 31, characterized by the fact that step a) consists in mixing the components of the synthetic binder at a temperature that ranges between 180 and 200° C.

33. Procedure as set forth in claim 31, characterized by the fact that the second step b), consists of the incorporation into the synthetic binder, under agitation, of an emulsifying solution made from a non-ionic or cationic emulsifier, introduced at a ratio that ranges between 3 and 8% by mass of the emulsifying solution.

34. Procedure as set forth in claim 31, characterized by the fact that in step c) the latex emulsion is either non-ionic or cationic, and the incorporation of the latex emulsion is carried out at a ratio that ranges between approximately 15 and 30% by mass, at room temperature.

35. Procedure as set forth in claim 31, characterized by the fact that the synthetic binder is obtained by mixing a plasticizing agent that consists of an aliphatic hydrocarbonic compound, whose number of carbon atoms is greater than or equal to 20 and a structuring agent that consists of a cycloaliphatic hydrocarbonic polymer.

36. Application of a synthetic bitumen emulsion, wherein the synthetic bitumen emulsion consists essentially of clear binders and optionally colored pigments, characterized by the fact that the synthetic bitumen emulsion contains:

at least one clear synthetic binder with a softening point or a ball-ring temperature (TBA), measured in accordance with the NF T 66-008 standard, that ranges between 30 and 100° C., at least one compound of the latex family, introduced in a quantity that ranges between 3 and 40% by weight of the emulsion, water, and at least one emulsifying agent, wherein the application of the synthetic bitumen emulsion is to the making of a colored surface treatment on a damp-proofing material that consists of at least one base coat, characterized by the fact that the synthetic bitumen deposit, to which are added colored pigments, is obtained by spreading this emulsion on the base coat and breaking down the emulsion by evaporation of its water.

37. Application as set forth in claim 36, characterized by the fact that the surface treatment layer has a ball-ring temperature (TBA) that is greater than 160° C.

38. Application of an emulsion as set forth in claim 36, wherein the damp-proofing material is a membrane or coat.

39. Application of a synthetic bitumen emulsion, wherein the synthetic bitumen emulsion consists essentially of clear binders and optionally colored pigments, characterized by the fact that the synthetic bitumen emulsion contains:

at least one clear synthetic binder with a softening point or a ball-ring temperature (TBA), measured in accordance with the NF T 66-008 standard, that ranges between 30 and 100° C., at least one compound of the latex family, introduced in a quantity that ranges between 3 and 40% by weight of the emulsion, water, and at least one emulsifying agent, wherein the application of the synthetic bitumen emulsion is to the making of a colored surface treatment for cold roadway applications on a support, characterized by the fact that the deposit of the synthetic binder, to which are added colored pigments and aggregates, is obtained by cold spreading and chemical break down of said emulsion.

40. Application of an emulsion as set forth in claim 39, wherein the cold roadway applications are selected from the group consisting of sealing coats, cold poured coats, and slurries.

* * * * *